US009631155B2

(12) United States Patent
Talwar

(10) Patent No.: US 9,631,155 B2
(45) Date of Patent: Apr. 25, 2017

(54) METHOD TO PRODUCE CHARCOAL WITHOUT PRODUCING BIO OIL THROUGH PYROLYSIS OF WOODY BIOMASS

(71) Applicant: Mahesh Talwar, Somis, CA (US)

(72) Inventor: Mahesh Talwar, Somis, CA (US)

( * ) Notice: Subject to any disclaimer, the term of this patent is extended or adjusted under 35 U.S.C. 154(b) by 0 days.

(21) Appl. No.: 14/935,620

(22) Filed: Nov. 9, 2015

(65) Prior Publication Data

US 2016/0060555 A1 Mar. 3, 2016

Related U.S. Application Data

(63) Continuation-in-part of application No. 14/510,298, filed on Oct. 9, 2014, now abandoned, which is a continuation-in-part of application No. 14/140,956, filed on Dec. 26, 2013, now abandoned, and a
(Continued)

(51) Int. Cl.

| C10B 47/00 | (2006.01) |
| C10L 5/36 | (2006.01) |
| C10L 5/14 | (2006.01) |
| C10L 9/08 | (2006.01) |
| C10K 1/10 | (2006.01) |
| C10L 1/02 | (2006.01) |
| C09D 191/00 | (2006.01) |
| C10B 47/44 | (2006.01) |
| C10B 53/02 | (2006.01) |
| C10B 57/02 | (2006.01) |
| C08L 91/00 | (2006.01) |
| C08L 95/00 | (2006.01) |
| C10L 5/44 | (2006.01) |
| C10L 5/00 | (2006.01) |

(52) U.S. Cl.
CPC ............. *C10L 5/361* (2013.01); *C08L 91/00* (2013.01); *C08L 95/00* (2013.01); *C09D 191/00* (2013.01); *C10B 47/44* (2013.01); *C10B 53/02* (2013.01); *C10B 57/02* (2013.01); *C10K 1/101* (2013.01); *C10L 1/02* (2013.01); *C10L 5/14* (2013.01); *C10L 5/447* (2013.01); *C10L 9/083* (2013.01); *C08L 2555/62* (2013.01); *C10L 2200/0469* (2013.01); *C10L 2290/08* (2013.01); *C10L 2290/24* (2013.01); *Y02E 50/10* (2013.01); *Y02E 50/14* (2013.01); *Y02E 50/15* (2013.01); *Y02E 50/30* (2013.01); *Y02P 20/145* (2015.11)

(58) Field of Classification Search
CPC .................................. C10B 53/02; C10L 5/44
USPC ........ 201/27; 202/96; 44/307, 280, 550, 567
See application file for complete search history.

(56) References Cited

U.S. PATENT DOCUMENTS

| 3,977,947 A * | 8/1976 | Pyle .................. C10B 49/10 |
| | | 201/27 |
| 2011/0214343 A1* | 9/2011 | Wechsler .............. C10B 53/02 |
| | | 44/605 |

(Continued)

*Primary Examiner* — Nina Bhat
(74) *Attorney, Agent, or Firm* — Kenneth L. Green; Averill & Green

(57) ABSTRACT

A biomass processing system produces charcoal briquettes in a closed loop system. The system includes a first and second torrefaction/drying augers drying green raw sawdust and providing the dried material to a carbonizing auger. Charcoal released from the carbonizing auger is formed into charcoal briquettes. Process gas created during the charcoal production is used to provide heat required by the process.

20 Claims, 3 Drawing Sheets

Related U.S. Application Data continuation-in-part of application No. 14/140,766, filed on Dec. 26, 2013, now abandoned.

(56) References Cited

U.S. PATENT DOCUMENTS

| | | | | |
|---|---|---|---|---|
| 2013/0067806 A1* | 3/2013 | Brock | C10L 5/44 | 44/589 |
| 2013/0263501 A1* | 10/2013 | Monroe | C10L 9/083 | 47/1.4 |
| 2014/0119997 A1* | 5/2014 | Shulenberger | B01J 6/008 | 422/109 |
| 2015/0152347 A1* | 6/2015 | Balon, Jr. | C10L 5/447 | 44/605 |
| 2015/0225649 A1* | 8/2015 | Kellens | C10B 23/00 | 202/99 |
| 2016/0053181 A1* | 2/2016 | Ericsson | C10B 7/00 | 202/117 |

* cited by examiner

METHOD TO PRODUCE CHARCOAL WITHOUT PRODUCING BIO OIL THROUGH PYROLYSIS OF WOODY BIOMASS

The present application is a Continuation In Part of U.S. patent application Ser. No. 14/140,766 filed Dec. 26, 2013 and U.S. patent application Ser. No. 14/140,956 filed Dec. 26, 2013 and U.S. patent application Ser. No. 14/510,298 filed Oct. 9, 2014, which applications are incorporated in their entirety herein by reference.

BACKGROUND OF THE INVENTION

The present invention relates to charcoal production and in particular to a method for converting woody biomass feed material into useful charcoal briquettes.

Biomass is comprised mainly of cellulose, hemi cellulose and lignin. A typical woody biomass may contain 40-50% cellulose, 25-35% hemi cellulose, and 15-18% lignin. Typical yields from a slow pyrolysis machine are 30% charcoal containing 70% plus carbon, 35% non-condensable gases containing hydrogen, methane, carbon mono oxide, carbon dioxide primarily, and 35% pyrolysis oil, also known as bio oil or bio crude, consisting tar, aldehydes, formic acid, acetic acid, water, esters, phenols, sugar derivatives, lignins. Such typical slow pyrolysis machine yields oil and charcoal in nearly equal portions. Slow pyrolysis involves heating of dried biomass (<8% moisture) in an oxygen free environment at 450-500 degrees centigrade in heated auger tubes. The process involves thermo chemical conversion of solid biomass to a liquid product, bio oil, and solid material, charcoal. Non-condensable gases are utilized to heat the incoming wet biomass material, thus creating a closed loop system.

Convention slow pyrolysis process yields bio oil that has the following properties:
Chemical formula: $CH_{1.3}O_{0.47}$
Flash point: 80 deg C.
pH=2.5
Sp Gr.=1.2
Moisture content: 20-25%
Heating value=7,522 btu/lb (17.5 mj/kg)
Viscosity=60-100 cp
and
Elemental analysis:
C=55-60%
H=5-8%
O=28-40%
N=0.06%

Rotary dryers are commonly used to dry biomass. There are several variations of rotary dryers, but the most widely-used is the directly heated single-pass rotary dryer. The directly heated single-pass rotary dryer uses hot gases contacting the biomass material inside a rotating drum. The rotation of the drum, with the aid of flights, lifts the solids in the dryer so they tumble through the hot gas, promoting better heat and mass transfer. The biomass and hot air normally flow co-currently through the dryer so the hottest gases come in contact with the wettest material. The exhaust gases leaving the dryer may pass through a cyclone, multi-cyclone, baghouse filter, scrubber or electrostatic precipitator (ESP) to remove any fine material entrained in the air. An ID fan may or may not be required depending on the dryer configuration. If an ID fan is needed, it is usually placed after the emissions control equipment to reduce erosion of the fan, but may also be placed before the first cyclone to provide the pressure drop through downstream equipment.

The inlet gas temperature to rotary biomass dryers can vary from 450°-2,000° F. (232°-1,093° C.). Outlet temperatures from rotary dryers vary from 160° to 230° F. (71°-110° C.), with most of the dryers having outlet temperatures higher than 220° F. (104° C.) to prevent condensation of acids and resins. Retention times in the dryer can be less than a minute. While known dryers generally perform adequately, they consume significant energy increasing the cost of processing the biomass material.

Further, known systems have difficulty processing wet biomass material, may produce unwanted oil, exhaust process gas, and lack efficiency.

BRIEF SUMMARY OF THE INVENTION

The present invention addresses the above and other needs by providing a biomass processing system which produces charcoal briquettes in a closed loop system. The system includes a first and second torrefaction/drying augers drying green raw sawdust and providing the dried material to a carbonizing auger. Charcoal released from the carbonizing auger is formed into charcoal briquettes. Process gas created during the charcoal production is used to provide heat required by the process.

In accordance with one aspect of the invention, there is provided a biomass processing system capable of processing wet raw biomass. A first and second torrefaction/drying augers drying green raw sawdust before providing the dried material to a carbonizing auger.

In accordance with another aspect of the invention, there is provided a biomass processing system having zero production of oil. Pyrolysis is done in the presence of steam and higher temperature. Partially carbonized material fed to the second torrefaction/drying auger also acts as a catalyst for the conversion of tar to gases.

In accordance with yet another aspect of the invention, there is provided a biomass processing system providing a complete closed loop system. Process gas is rerouted to supply process heat, water produced is neutralized and utilized to make briquettes, charcoal is sold as product.

In accordance with still another aspect of the invention, there is provided a biomass processing system providing a small foot print. The system does not require an external dryer thus reducing the foot print of the plant.

In accordance with another aspect of the invention, there is provided a biomass processing system providing higher process efficiency. A heat recovery system optimizes the process heat demand. Stack gases exit to a heat recovery box, steam exits to an air heater, hot water return is used to heat the binder solution. Cracking of tar provides higher gas yields. Two step pyrolysis provides higher charcoal yields.

In accordance with yet another aspect of the invention, there is provided a biomass processing system providing environmentally superior performance. The only emission point is the stack gases. Utilization of process gas to provide heat provides lower NOx and particle emissions.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
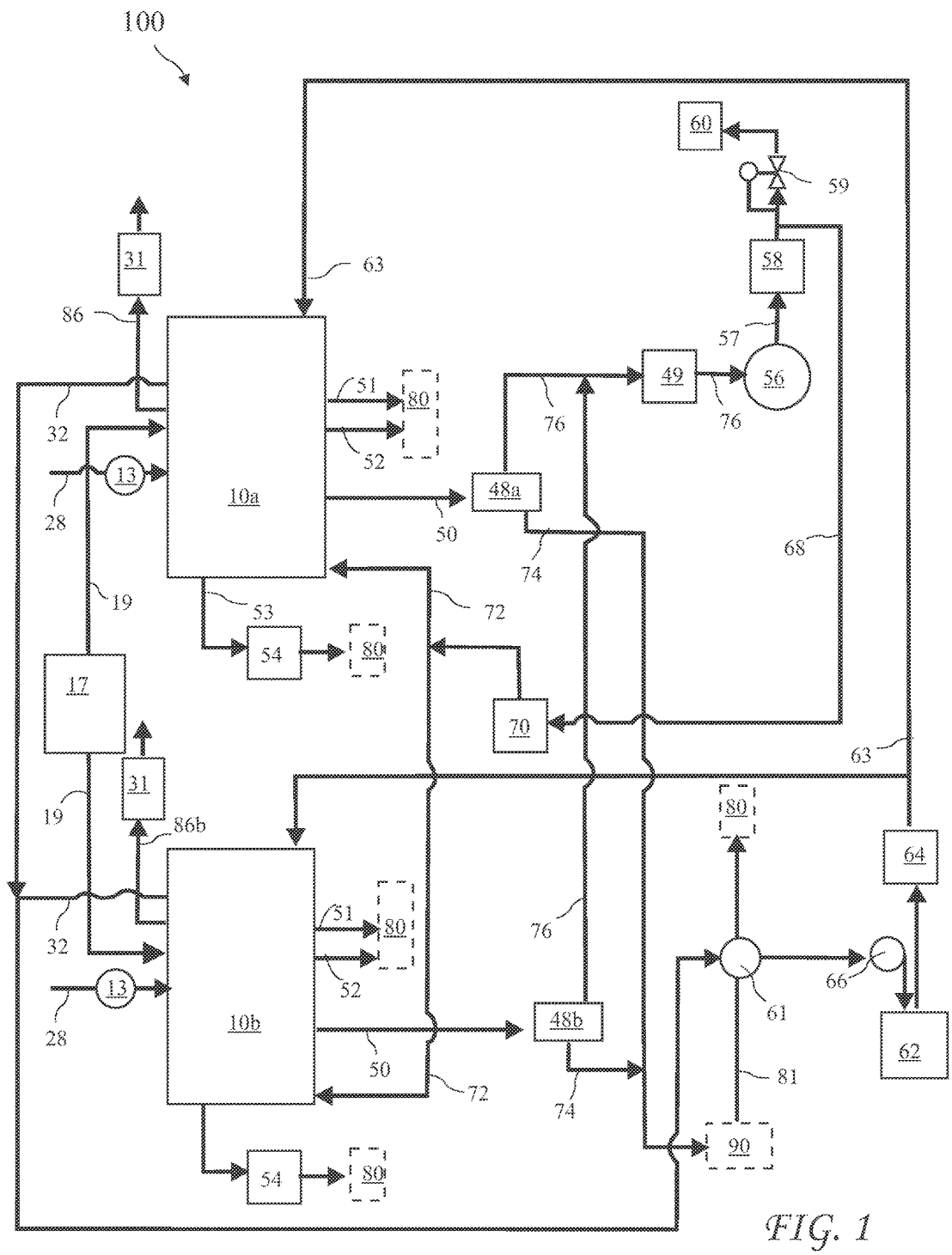
FIG. 1 is a biomass processing system for producing charcoal briquettes according to the present invention.

A biomass processing system 100 according to the present invention is shown in FIG. 1. The biomass processing system 100 includes two pyrolysis systems 10a and 10b, both fed green raw sawdust 19 stored in a bin 17. The pyrolysis systems 10a and 10b further receive ambient air 28, cooling water 63, and process gas 72. Prior to entering the heat exchangers 24, the air 28 may be pre heated by steam captured from the condensers 38 and advanced by a fan. The pyrolysis systems 10a and 10b produce heated water 32, liquid/gas mixture bio oil 50, solids 51, heated air 52, and charcoal 53. The solids 51, heated air 52, and charcoal 53 of the pyrolysis systems 10a and 10b are depicted provided to multiple instances of bulk packaging 80 for convenience, and only one bulk packaging 80 is necessarily present in the biomass processing system 100.

The liquid/gas mixture bio oil 50 is provided to separator vessels 48a and 48b. The separator vessels 48a and 48b separate the liquid/gas mixture bio oil 50 into non-condensable gases 76 and condensed liquids 74. The liquid 74 is provided to condensables processing 90. Non-condensable gases 76 from the separator vessels 48a and 48b are provided to non-condensable gases vessel 49 and on to condensable gases compressor 56 where the non-condensable gases 76 is compressed to preferably 8 inches of Water Column (WC) pressure and resulting compressed gases 57 are discharged to compressed gases vessel 58 to remove trapped moisture. Gas 68 from the vessel 58 is then provided to final moisture catch vessel 70 to create process gas 72, and process gas 72 to process gas burners 23b (see FIG. 2). Excess gas from the vessel 58 is provided to flare 60 through back pressure regulator 59.

Figure 2:
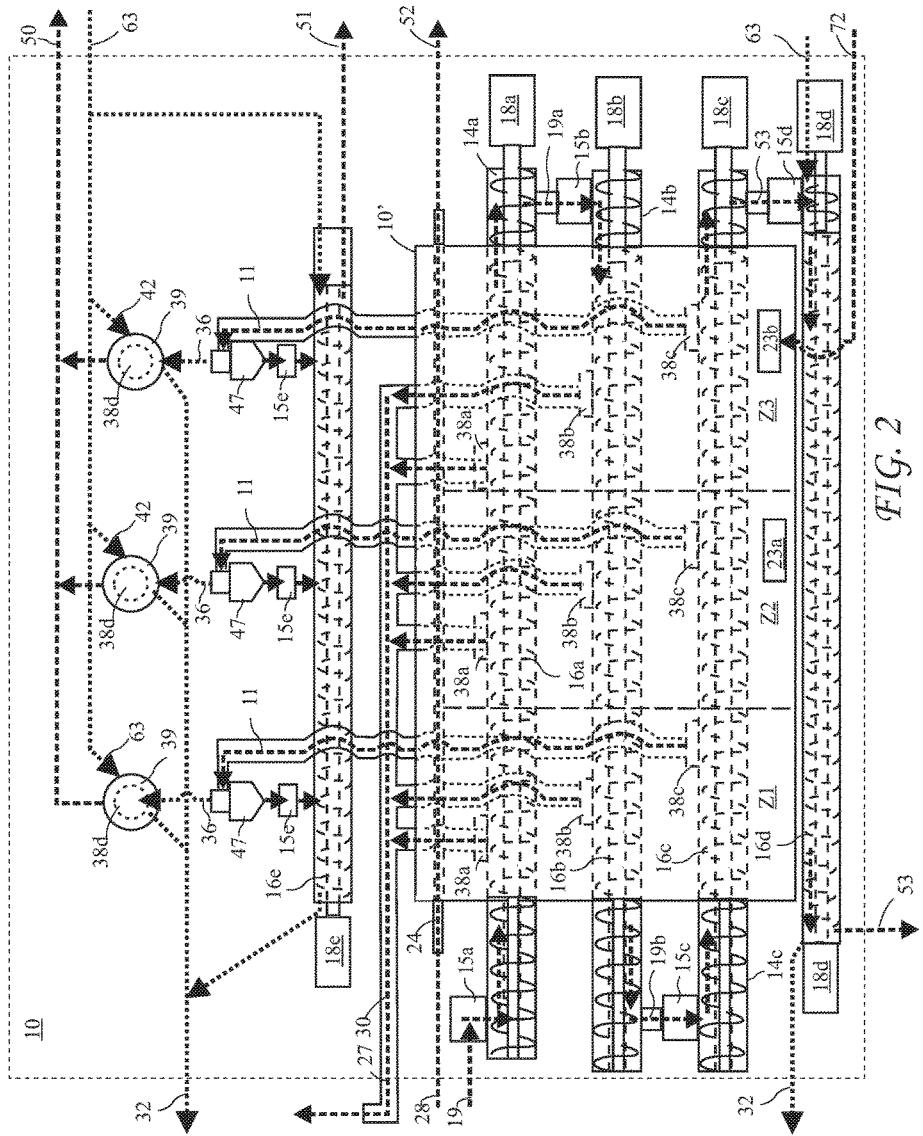
FIG. 2 is a pyrolysis system according to the present invention.

The pyrolysis systems 10a and 10b are described in FIG. 2. The pyrolysis systems 10a and 10b each contain a pyrolysis chamber 10' containing three sealed augers 16a, 16b, and 16c, a top air heater 24, and two burners 23a and 23b. A bottom charcoal discharge auger 16d resides under the pyrolysis chamber 10'. Auger speed is preferably about 1 RPM. A typical auger is between 20 and 24 inches in diameter and about 20 ft. long. The green raw sawdust 19 is fed through first air lock 15a into first sealed auger 16a rotated by first auger motor 18a. The feed rate into the pyrolysis systems 10a and 10b is preferably 6 tons per hour of green raw sawdust 19.

In the top sealed auger 16a, the green raw sawdust material 19 is partially carbonized and dried to about 16% moisture content providing a partially carbonized material 19a. The dried, partially carbonized material 19a is released through second air lock 15b to the second sealed auger 16b rotated by second auger motor 18b and dried additionally to produce additionally carbonized material 19b. The additionally carbonized material 19b is finally released through air lock 15c into the bottom charcoal discharge (or pyrolysis) auger 16c, where temperature again is maintained at 500-600 degrees Centigrade. Material in the bottom charcoal discharge auger 16c then begins to pyrolysis and volatiles are removed from the additionally carbonized material 19b to produce charcoal output 53 with almost 80% carbon content.

Charcoal output 53 from the charcoal discharge auger 16c is discharged to the charcoal cooler auger 16d rotated by fourth auger motor 18d. The charcoal output 53 is cooled in the cooler auger 16d by the cooled water 63 to about 80 degrees Fahrenheit and discharged to bucket elevator 54 and carried to bulk packaging 80.

Pyrolysis gases 11 from the pyrolysis systems 10a and 10b collected from the charcoal discharge auger 16c by auger condensers 38c are carried to a cyclones 47. The cyclones 47 are preferably about 20 inches in size. Gases 36 exit the cyclones 47 and go to doubled walled condensers 38d where the gases 36 are cooled by cooling water 63. The cooling process condenses all condensables in the gases 36 (water, acetic acid, and formic acid primarily). The liquid-gas mixture 50 is then provided to the separator vessels 48a and 48b (see FIG. 1).

Solids 51 collected by the cyclones 47 fall through air locks 15c into cyclone discharge cooler auger 16e and are cooled by cooling water 63 and discharged to the bulk packaging 80.

Steam 27 is collected by condensers 38a and 38b from the augers 16a and 16b respectively is collected in a common manifold 30 and is pulled by an exhaust fans 31 (see FIG. 1) and is exhausted into the atmosphere.

The pyrolysis systems 10a and 10b further includes a heat exchanger 24 residing above the auger 16a and where air blown through the heat exchangers 24 by fan 13 is heated to about 180 degrees Fahrenheit and provided to the bulk packaging 80 (see FIG. 3) to dry the charcoal briquettes.

The heated water 32 is collected from the condensers 38, the charcoal cooler auger 16d, and cyclone discharge cooler augers 16e. The heated water 32 is first routed to heat exchanger 61 where heat is transferred to the charcoal binder 81 (see FIGS. 3 and 4) used to form for briquettes. After the heat exchanger 61, the heated water 32 (now somewhat cooled) is pumped by pump 66 through a cooling tower 62 where it is cooled from about 150 degrees Fahrenheit to about 65 degrees Fahrenheit, and into a cooling water tank 64 for storage. The cooled water 63 from the cooling water tank 64 is then cycled back to the pyrolysis systems 10a and 10b.

The pyrolysis systems 10a and 10b are heated to a process temperature Tp between 500 and 600 degrees Centigrade. Upon startup, the pyrolysis systems 10a and 10b are heated by propane burners 23a. Once the pyrolysis systems 10a and 10b reach the process temperature Tp, the pyrolysis systems 10a and 10b produce process gas, the startup burners 23a are turned off and process heat is provided by the burners 23b burning the process gas 72 produced by the pyrolysis systems 10a and 10b. The burners 23a and 23b are rated at 2.5 mmbtu/hr each.

Figure 3:
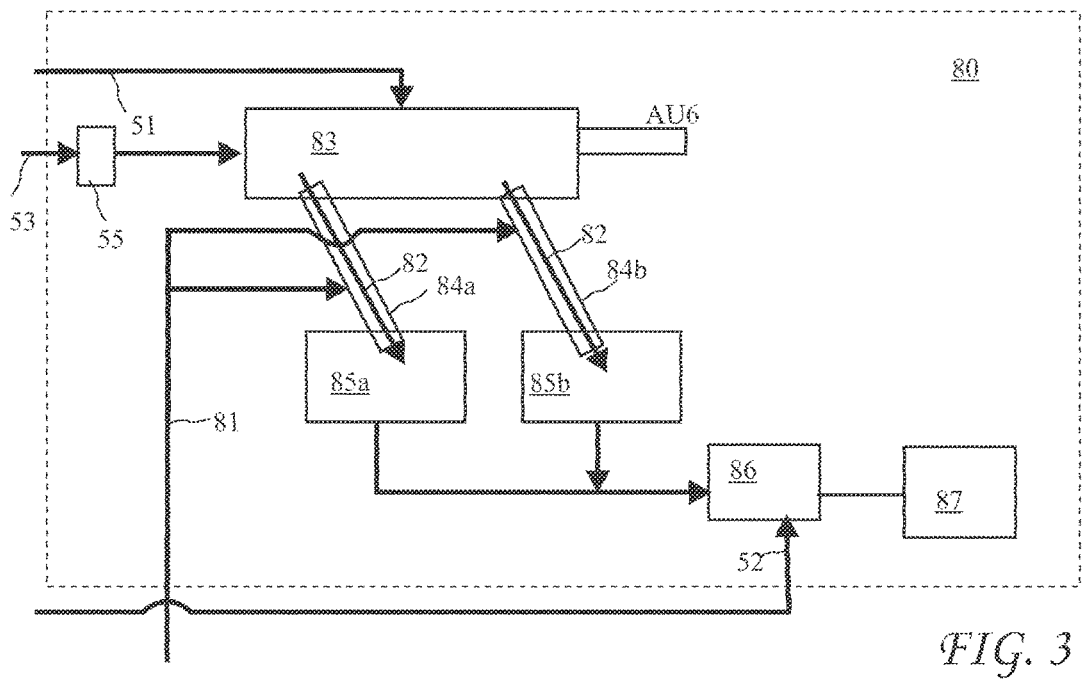
FIG. 3 is a bulk packaging system according to the present invention.

Bulk packaging 80 is described in FIG. 3. The solids 51 and charcoal 53 are provided to a surge bin 83. Charcoal 82 from the surge bin 83 is provided to two briquette machines 89a and 89b through augers 84a and 84b. A charcoal binder solution 81 (see FIG. 4) is injected into the augers 89a and 89b. Extruder type machines 85a and 85b apply pressure to the charcoal and binder and push the charcoal and binder through a tapered screw to produce hexagonal briquettes that can be 1 inch to 4 inches long, 1 inch in diameter with a 1/16th inch hole in the middle. The briquettes at this point contain about 30% moisture and need to be dried. The wet briquettes are then provided to the belt dryer 86 where hot air 52 is blown from underneath the belt to dry the charcoal to about 8% moisture content. Dried charcoal is then provided to packaging section 87.

Figure 4:
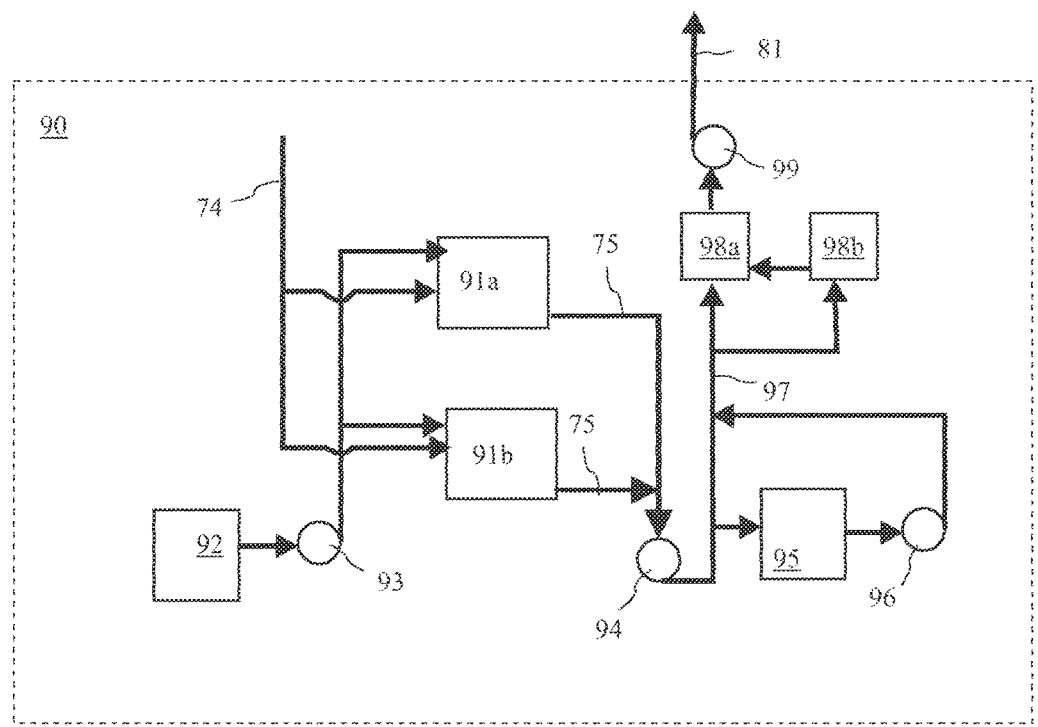
FIG. 4 is a condensables processing system according to the present invention.

Binder production 90 is described in FIG. 4. A concentrated binder 73 contained in binder vessel 92 is pumped by pump 93 and mixed with condensed liquids 74 in mixing vessels 91a and 91b. A mixed binder 75 is pumped by pump 94 to mixing vessels 98a and 98b and the binder solution is then pumped by pump 99 to be heated in the heat exchanger 61 by the hot water 32. Reservoir vessel 95 and pump 96 maintain a flow of the mixed binder to the mixing vessels 98a and 98b.

While the invention herein disclosed has been described by means of specific embodiments and applications thereof, numerous modifications and variations could be made thereto by those skilled in the art without departing from the scope of the invention set forth in the claims.

I claim:

1. A method for producing charcoal, the method comprising:
    feeding wet biomass to at least one pyrolysis system including a pyrolysis chamber containing two sealed torrefaction/drying augers and a sealed pyrolysis auger;
    feeding the wet biomass sequentially through the two torrefaction/drying sealed augers;
    drying the biomass to create dry biomass in the torrefaction/drying augers;
    releasing the dry biomass into the pyrolysis auger;
    converting the dry biomass into charcoal in the pyrolysis auger by a pyrolysis process;
    releasing the charcoal from the pyrolysis auger into a charcoal discharge auger
    discharging charcoal from the charcoal discharge auger;
    carrying the discharged charcoal from the at least one pyrolysis systems to a bulk packaging system;
    mixing the discharged charcoal with a charcoal binder;
    forming the mixed charcoal and binder into charcoal briquettes; and
    drying the charcoal briquettes.

2. The method of claim 1, further including:
    separating a liquid/gas mixture produced by the at least one pyrolysis systems into process gas and into condensed liquids; and
    heating the at least one pyrolysis systems by the process gas.

3. The method of claim 2, further including mixing the condensed liquids with concentrated binder to provide the binder.

4. The method of claim 2, wherein the liquid/gas mixture is produced by a method comprising:
    separating pyrolysis gases from the dry biomass in the pyrolysis auger;
    providing the pyrolysis gases to condensers; and
    cooling the pyrolysis gases in the condensers to produce the liquid/gas mixture.

5. The method of claim 4, wherein providing the pyrolysis gases to condensers comprises:
    providing the pyrolysis gases to cyclones; and
    separating the pyrolysis gases into vapor provided to the condensers and solids.

6. The method of claim 5, further including combining the solids with the charcoal from the charcoal discharge auger used to produce the charcoal briquettes.

7. The method of claim 4, further including:
    providing the liquid/gas mixture to separator vessels;
    separating the liquid/gas mixture into non-condensable gases and condensed liquids;
    compressing the non-condensable gases into compressed gases;
    discharging the compressed gases to a compressed gases vessel;
    removing trapped moisture from the compressed gases to produce dried gas;
    providing the dried gas from the compressed gases vessel to a final moisture catch vessel to create process gas; and
    providing the process gas to process gas burners in the pyrolysis chambers.

8. The method of claim 7, wherein the process gas provides all the energy required to maintain heat the pyrolysis chamber to produce the charcoal after reaching full production of the process gas by the pyrolysis.

9. The method of claim 1, wherein converting the dry biomass into charcoal in the pyrolysis auger comprises converting the dry biomass into charcoal in the pyrolysis auger at between 500 and 600 degrees centigrade.

10. The method of claim 9, wherein drying the biomass to create dry biomass in the torrefaction/drying augers comprises drying the biomass to create dry biomass in the torrefaction/drying augers at between 500 and 600 degrees centigrade.

11. The method of claim 9, wherein converting the dry biomass into charcoal in the pyrolysis auger at between 500 and 600 degrees centigrade comprises converting the dry biomass into charcoal including almost 80 percent carbon content.

12. The method of claim 1, wherein:
    air is urged though an air heater in the pyrolysis chamber to produce heated air; and
    the heated air is used to dry the charcoal briquettes.

13. The method of claim 1, wherein converting the dry biomass into charcoal in the pyrolysis auger at between 500 and 600 degrees centigrade comprises producing charcoal output with almost 80% carbon content.

14. A method for producing charcoal, the method comprising:
    feeding wet biomass to at least one pyrolysis system including a pyrolysis chamber containing two sealed torrefaction/drying augers and a sealed pyrolysis auger;
    maintaining the pyrolysis auger at between 500 and 600 degrees centigrade during operation;
    feeding the wet biomass sequentially through the two torrefaction/drying augers;
    drying the biomass to create dry biomass in the torrefaction/drying augers;
    releasing the dry biomass into the pyrolysis auger;
    converting the dry biomass into charcoal in the pyrolysis auger by pyrolysis at the between 500 and 600 degrees centigrade temperature;
    releasing the charcoal formed by pyrolysis from the pyrolysis auger into a charcoal discharge auger;
    discharging charcoal from the charcoal discharge auger;

carrying the discharged charcoal from the at least one pyrolysis systems to a bulk packaging system;

mixing the discharged charcoal with a charcoal binder;

forming the mixed charcoal and binder into charcoal briquettes; and drying the charcoal briquettes.

15. The method of claim 14, further including:

separating a liquid/gas mixture produced by the at least one pyrolysis systems into process gas and into condensed liquids; and heating the at least one pyrolysis systems by the process gas.

16. The method of claim 15, wherein providing the pyrolysis gases to condensers comprises:

providing the pyrolysis gases to cyclones;

separating the pyrolysis gases into vapor provided to the condensers and solids; and combining the solids with the charcoal from the charcoal discharge auger used to produce the charcoal briquettes.

17. The method of claim 16, further including:

providing the liquid/gas mixture to separator vessels;

separating the liquid/gas mixture into non-condensable gases and condensed liquids;

compressing the non-condensable gases into compressed gases;

discharging the compressed gases to a compressed gases vessel;

removing trapped moisture from the compressed gases to produce dried gas;

providing the dried gas from the compressed gases vessel to a final moisture catch vessel to create process gas; and providing the process gas to process gas burners in the pyrolysis chambers.

18. The method of claim 17, wherein the process gas provides all the energy required to maintain heat the pyrolysis chamber to produce the charcoal after reaching full production of the process gas by the pyrolysis.

19. A method for producing charcoal, the method comprising:

feeding wet biomass to at least one pyrolysis system including a pyrolysis chamber containing two sealed torrefaction/drying augers and a sealed pyrolysis auger;

maintaining the torrefaction/drying augers and pyrolysis auger at between 500 and 600 degrees centigrade during operation;

feeding the wet biomass sequentially through the two torrefaction/drying augers;

drying the biomass to create dry biomass in the torrefaction/drying augers;

releasing the dry biomass into the pyrolysis auger;

converting the dry biomass into charcoal in the pyrolysis auger by pyrolysis at the between 500 and 600 degrees centigrade temperature;

releasing the charcoal from the pyrolysis auger into a charcoal discharge auger;

discharging charcoal from the charcoal discharge auger;

separating pyrolysis gases from the dry biomass in the pyrolysis auger;

providing the pyrolysis gases to condensers;

cooling the pyrolysis gases in the condensers to produce a liquid/gas mixture;

processing the liquid/gas mixture to produce process gas;

providing the process gas to process gas burners in the pyrolysis chamber to heat the augers;

carrying the discharged charcoal from the at least one pyrolysis systems to a bulk packaging system;

mixing the discharged charcoal with a charcoal binder;

forming the mixed charcoal and binder into charcoal briquettes; and drying the charcoal briquettes.

20. The method of claim 19, wherein the process gas provides all the energy required to maintain heat the pyrolysis chamber to produce the charcoal after reaching full production of the process gas by the pyrolysis.

* * * * *